United States Patent
Lee et al.

(10) Patent No.: US 9,432,856 B2
(45) Date of Patent: Aug. 30, 2016

(54) METHOD FOR DECIDING TRANSMISSION OF SIGNAL

(75) Inventors: Youngdae Lee, Anyang-si (KR);
Sunghoon Jung, Anyang-si (KR);
Seungjune Yi, Anyang-si (KR);
Sungduck Chun, Anyang-si (KR);
Sungjun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 139 days.

(21) Appl. No.: 14/009,421

(22) PCT Filed: Mar. 30, 2012

(86) PCT No.: PCT/KR2012/002370
§ 371 (c)(1),
(2), (4) Date: Oct. 31, 2013

(87) PCT Pub. No.: WO2012/138079
PCT Pub. Date: Oct. 11, 2012

(65) Prior Publication Data
US 2014/0050102 A1    Feb. 20, 2014

Related U.S. Application Data

(60) Provisional application No. 61/471,175, filed on Apr. 3, 2011.

(51) Int. Cl.
*H04W 24/04* (2009.01)
*H04W 24/10* (2009.01)
*H04W 76/02* (2009.01)
*H04L 1/18* (2006.01)

(52) U.S. Cl.
CPC ............ *H04W 24/04* (2013.01); *H04W 24/10* (2013.01); *H04L 1/1867* (2013.01); *H04W 76/028* (2013.01)

(58) Field of Classification Search
CPC . H04W 24/04; H04W 24/10; H04W 76/028; H04L 1/1867; H04L 1/0078
USPC ........................................................ 370/242
See application file for complete search history.

(56) References Cited

U.S. PATENT DOCUMENTS

| | | | |
|---|---|---|---|
| 2008/0242292 A1* | 10/2008 | Koskela et al. | 455/423 |
| 2010/0202391 A1* | 8/2010 | Palanki et al. | 370/329 |
| 2010/0267378 A1* | 10/2010 | Hamabe et al. | 455/423 |
| 2011/0077010 A1 | 3/2011 | Xu et al. | |
| 2011/0201279 A1* | 8/2011 | Suzuki et al. | 455/67.11 |
| 2011/0222411 A1* | 9/2011 | Koskinen et al. | 370/241 |
| 2011/0242965 A1* | 10/2011 | Strzyz et al. | 370/216 |

(Continued)

FOREIGN PATENT DOCUMENTS

| | | | | |
|---|---|---|---|---|
| CN | 103906270 A | * | 7/2014 | H04W 76/02 |
| EP | 2 230 864 A1 | | 9/2010 | |

(Continued)

*Primary Examiner* — Un C Cho
*Assistant Examiner* — Shah Rahman
(74) *Attorney, Agent, or Firm* — Birch, Stewart, Kolasch & Birch, LLP

(57) ABSTRACT

In the present invention, a user equipment measures a wireless signal from a specific cell, and decides whether to store and/or report to a base station information on a wireless link failure, if the wireless link failure occurs, depending on the type of a cell which is measured or the type of a frame in which the wireless link failure occurs. According to the present invention, the user equipment can be prevented from reporting unnecessary information to a network.

5 Claims, 11 Drawing Sheets

(56) References Cited

U.S. PATENT DOCUMENTS

| | | |
|---|---|---|
| 2011/0250925 A1 | 10/2011 | Han |
| 2011/0319025 A1* | 12/2011 | Siomina ............... H04B 7/024 455/63.1 |
| 2012/0069728 A1 | 3/2012 | Jung et al. |
| 2012/0157082 A1* | 6/2012 | Pedersen ............. H04W 24/10 455/422.1 |
| 2012/0202557 A1* | 8/2012 | Olofsson ............. H04W 24/08 455/525 |
| 2012/0311147 A1* | 12/2012 | Keskitalo .................... 709/224 |
| 2012/0329400 A1* | 12/2012 | Seo ....................... H04J 11/005 455/63.1 |
| 2013/0033998 A1* | 2/2013 | Seo et al. ..................... 370/252 |
| 2013/0215857 A1* | 8/2013 | Wu ..................... H04W 52/143 370/329 |
| 2013/0229940 A1* | 9/2013 | Baker .................. H04W 24/10 370/252 |
| 2013/0288665 A1* | 10/2013 | Gao et al. ..................... 455/423 |

FOREIGN PATENT DOCUMENTS

| | | |
|---|---|---|
| KR | 10-2010-0129690 A | 12/2010 |
| WO | WO 2011/006376 A1 | 1/2011 |

* cited by examiner (a) Control-Plane Protocol Stack (b) User-Plane Protocol Stack

METHOD FOR DECIDING TRANSMISSION OF SIGNAL

This application is the National Phase of PCT/KR2012/002370 filed on Mar. 30, 2012, which claims priority under 35 U.S.C. 119(e) to U.S. Provisional Application No. 61/471,175 filed on Apr. 3, 2011, all of which are hereby expressly incorporated by reference into the present application.

TECHNICAL FIELD

The present invention relates to a wireless communication system. More specifically, the present invention relates to a method and apparatus for reporting information related to a cell measurement result and a method and apparatus for receiving the information.

BACKGROUND ART

As an example of a wireless communication system to which the present invention is applicable, a 3rd generation partnership project (3GPP) long term evolution (LTE) communication system is described in brief.

FIG. 1 is a view schematically illustrating a network structure of an E-UMTS as an exemplary radio communication system. An evolved universal mobile telecommunications system (E-UMTS) is an advanced version of a conventional universal mobile telecommunications system (UMTS) and basic standardization thereof is currently underway in the 3GPP. E-UMTS may be generally referred to as an LTE system. For details of the technical specifications of the UMTS and E-UMTS, reference can be made to Release 7 and Release 8 of the 3GPP technical specification (TS), respectively.

Referring to FIG. 1, the E-UMTS includes a user equipment (UE), eNode Bs (eNBs), and an access gateway (AG), which is located at an end of a network (Evolved Universal Terrestrial Radio Access Network (E-UTRAN)) and connected to an external network. The eNBs may simultaneously transmit multiple data streams for a broadcast service, a multicast service, and/or a unicast service.

One eNB manages one or more cells. A cell is configured to use one of bandwidths of 1.25, 2.5, 5, 10, and 20 MHz to provide a downlink or uplink transport service to several UEs. Different cells may be set to provide different bandwidths. The eNB controls data transmission and reception for one or more UEs. The eNB transmits downlink scheduling information with respect to downlink data to notify a corresponding UE of a time/frequency domain in which data is to be transmitted, coding, data size, and hybrid automatic repeat and request (HARQ)-related information. In addition, the eNB transmits uplink scheduling information with respect to uplink data to a corresponding UE to inform the UE of an available time/frequency domain, coding, data size, and HARQ-related information. An interface may be used between eNBs to transmit user traffic or control traffic. A core network (CN) may include the AG, a network node for user registration of the UE, and the like. The AG manages mobility of a UE on a tracking area (TA) basis, each TA including a plurality of cells.

Although radio communication technology has been developed up to 3GPP LTE(-A) based on wideband code division multiple access (WCDMA), demands and expectations of users and providers continue to increase. In addition, since other radio access technologies continue to be developed, new advances in technology are required to secure future competitiveness. Decrease of cost per bit, increase of service availability, flexible use of a frequency band, simple structure, open interface, and suitable power consumption by a UE are required.

DISCLOSURE

Technical Problem

The present invention provides a method and apparatus in which a user equipment measures a radio link and reports radio link measurement and a method and apparatus in which a base station receives a report on radio link measurement from the user equipment.

It will be appreciated by persons skilled in the art that that the technical objects that can be achieved through the present invention are not limited to what has been particularly described hereinabove and other technical objects of the present invention will be more clearly understood from the following detailed description.

Technical Solution

As an aspect of the present invention, provided herein is a method for determining whether to transmit signals at a user equipment in a radio communication system, including detecting a radio link failure for a first cell in at least one frame and determining whether to transmit a report on the radio link failure to a network according to at least one of a type of the first cell and a type of the at least one frame.

As another aspect of the present invention, provided herein is a user equipment for determining whether to transmit signals in a radio communication system, including a radio frequency (RF) unit for transmitting a radio signal and a processor configured to control the RF unit, wherein the processor is configured to detect a radio link failure for a first cell in at least one frame and to determine whether to transmit a report on the radio link failure to a network according to at least one of a type of the first cell and a type of the at least one frame.

In each aspect of the present invention, the report on the radio link failure may not be transmitted to the network if at least one of the type of the first cell and the type of the at least one frame is corresponding to a specific type.

In each aspect of the present invention, the type of the first cell may be a closed subscriber group (CSG) cell.

In each aspect of the present invention, if the type of the first cell is the CSG cell, information about the radio link failure may not be stored.

In each aspect of the present invention, the report on the radio link failure may be transmitted to the network if at least one of the type of the first cell and the type of the at least one frame is not corresponding to a specific type.

In each aspect of the present invention, information about the radio link failure may be stored if at least one of the type of the first cell and the type of the at least one frame is not corresponding to a specific type.

In each aspect of the present invention, the report on the radio link failure may be transmitted to the network through a second cell different from the first cell and the first cell may have a public land mobile network (PLMN) identifier different from the second cell.

In each aspect of the present invention, the information about the radio link failure may include at least one of information about the type of the cell and information about the type of the at least one frame.

In each aspect of the present invention, the type of the at least one frame may be an almost blank subframe (ABS).

In each aspect of the present invention, the report on the radio link failure may be stored when the user equipment transitions to a radio resource control (RRC) idle state, and the report on the radio link failure may be transmitted to the network when the user equipment transitions to an RRC connected state.

In each aspect of the present invention, the method may further comprises receiving a radio link failure reporting request message from the network and transmitting the report on the radio link failure to the network through a second cell different from the first cell.

The above solutions of the present invention are merely some parts of the embodiments of the present invention and various embodiments into which the technical features of the present invention are incorporated can be derived and understood by those skilled in the art from the detailed description of the present invention which follows.

Advantageous Effects

According to embodiments of the present invention, a user equipment can be prevented from reporting unnecessary information to a network.

In addition, according to the present invention, the risk of incorrectly interpreting radio link by a network can be reduced and, therefore, operation efficiency of the network by an operator can be increased.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
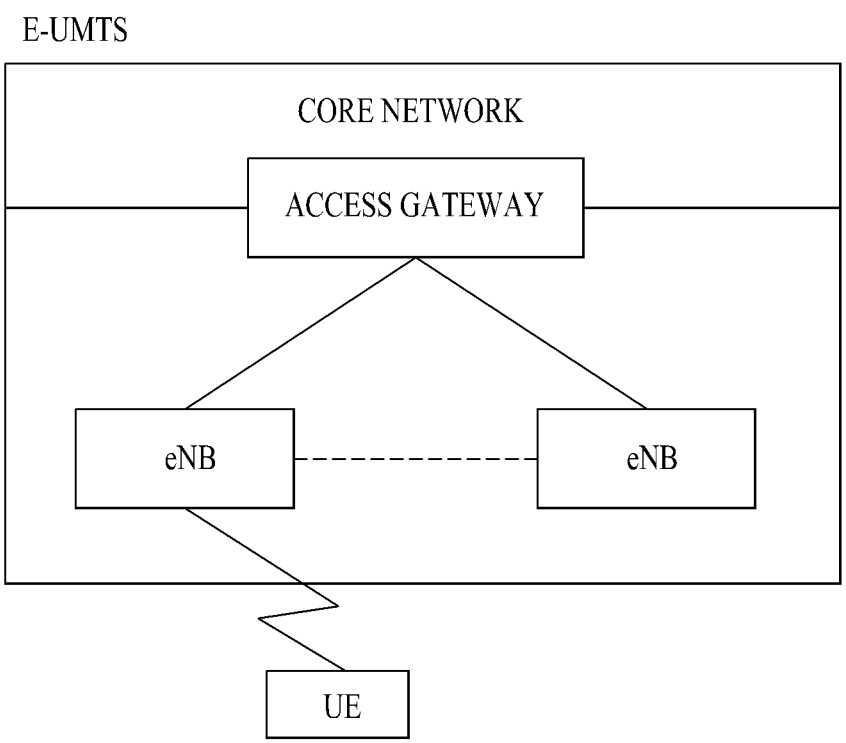
FIG. 1 is a view schematically illustrating a network structure of an E-UMTS as an exemplary radio communication system.

The following embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the present specification, embodiments of the present invention are described focusing upon a data transmission and reception relationship between an eNB and a UE. Here, the eNB refers to a terminal node of a network communicating directly with the UE. In the present specification, a specific operation described as being performed by the eNB may be performed by an upper node of the eNB. Namely, it is apparent that, in a network comprised of a plurality of network nodes including the eNB, various operations performed for communication with the UE may be performed by the eNB or network nodes other than the eNB. The term 'eNB' (eNode B) may be replaced with the terms fixed station, base station (BS), Node B, access point, etc. The term relay may be replaced with the terms relay node (RN), relay station (RS), etc. The term 'UE' may be replaced with the terms terminal, mobile station (MS), mobile subscriber station (MSS), subscriber station (SS), etc.

The specific terms used in the following description are provided to aid in understanding of the present invention and may be changed without departing from the spirit of the present invention.

In some instances, known structures and devices are omitted or are shown in block diagram form, focusing on important features of the structures and devices, so as not to obscure the concept of the present invention. The same reference numbers will be used throughout this specification to refer to the same or like parts.

Embodiments of the present invention can be supported by standard documents disclosed in at least one wireless access system, i.e. an IEEE 802 system, a 3GPP system, a 3GPP LTE system, an LTE-advanced (LTE-A) system, and a 3GPP2 system. Namely, among the embodiments of the present invention, steps or parts, description of which will be omitted in order to clarify the technical spirit of the present invention, can be supported by the above standard documents. In addition, all terms disclosed herein can be supported by the above standard documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied as radio technology such as universal terrestrial radio access (UTRA) or CDMA2000. TDMA may be embodied as radio technology such as global system for mobile communications (GSM)/general packet radio service (GPRS)/enhanced data rates for GSM evolution (EDGE). OFDMA may be embodied with radio technology such as IEEE 802.11 (Wi-Fi), IEEE 802.16 (WiMAX), IEEE 802-20, and evolved UTRA (E-UTRA). UTRA is a part of a universal mobile telecommunications system (UMTS). 3GPP LTE is part of an evolved UMTS (E-UMTS), which uses E-UTRA. 3GPP LTE employs OFDMA in downlink and employs SC-FDMA in uplink. LTE-advanced (LTE-A) is an evolved version of 3GPP LTE. WiMAX can be described by the IEEE 802.16e standard (WirelessMAN-OFDMA reference system) and advanced IEEE 802.16m standard (WirelessMAN-OFDMA advanced system). For clarity, the following description focuses on 3GPP LTE(-A). However, technical features of the present invention are not limited thereto.

In the present invention, a cell refers to a prescribed geographic region to which a communication service is provided by one eNB or one antenna group. In the present invention, communicating with a specific cell may mean communicating with an eNB or an antenna group that provides a communication service to the specific cell. In addition, a downlink/uplink signal of a specific cell may refer to a signal received/transmitted from/to an eNB or an antenna group of the specific cell.

Figure 2:
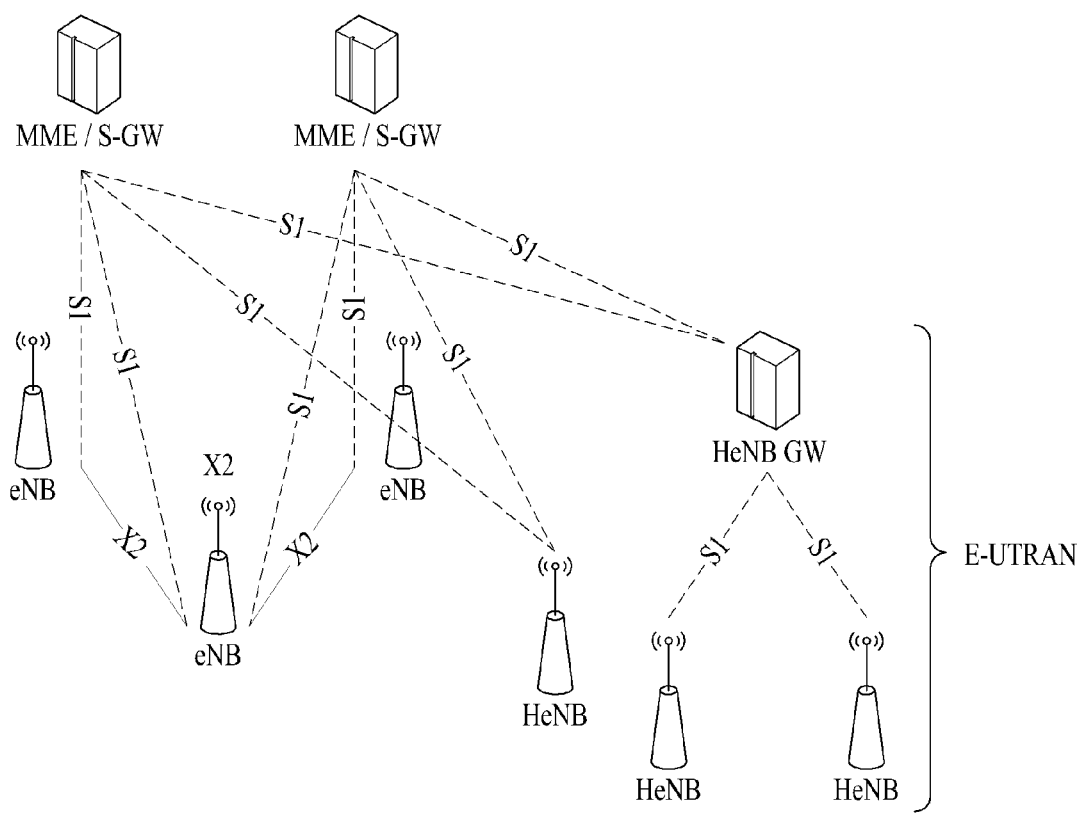
FIG. 2 is a view conceptually illustrating the structure of an evolved universal terrestrial radio access network (E-UTRAN).

FIG. 2 is a view conceptually illustrating the structure of an evolved universal terrestrial radio access network (E-UTRAN).

A 3GPP LTE system is a mobile communication system that has evolved from UMTS. As illustrated in FIG. 2, the 3GPP LTE system architecture can be roughly classified into an evolved UMTS terrestrial radio access network (E-UTRAN) and an evolved packet core (EPC). The E-UTRAN may include a UE and an eNB, wherein the connection between UE and the eNB is referred to as a Uu interface and the connection between the eNBs is referred to as an X2 interface. The EPC includes a mobility management entity (MME) performing a control plane function and a serving gateway (S-GW) performing a user plane function, wherein the connection between the eNB and the MME is referred to as an S1-MME interface, the connection between the eNB and the S-GW is referred to as an S1-U interface, and both connections are commonly referred to as an S1 interface.

Figure 3:
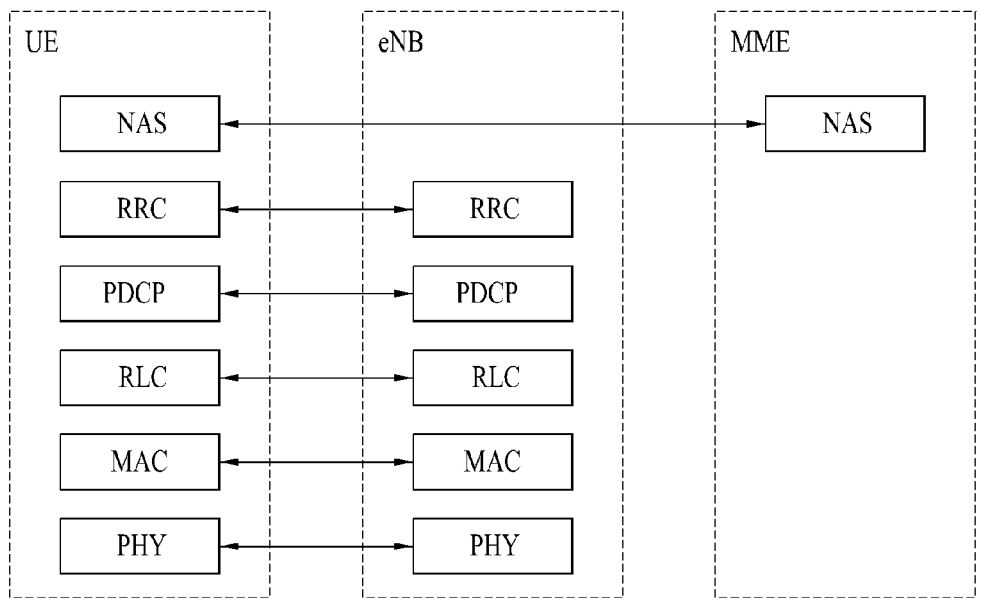
FIG. 3 is a view illustrating a control plane and a user plane of a radio interface protocol between a UE and an E-UTRAN based on a 3GPP radio access network specification.
Figure 3:
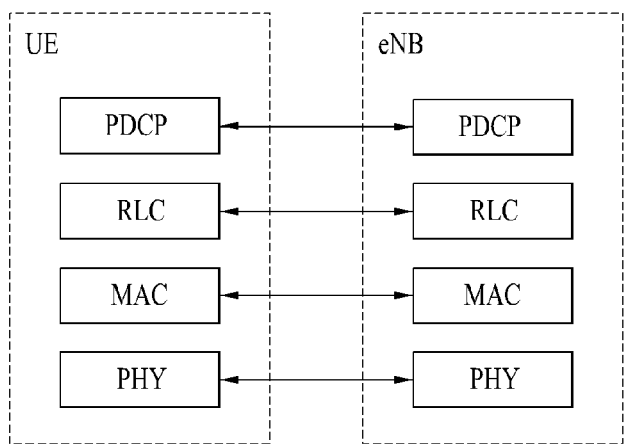

A radio interface protocol is defined for the Uu interface which is a radio interface. The radio interface protocol is horizontally comprised of a physical layer, a data link layer, and a network layer and is vertically classified into a user plane for user data transmission and a control plane for signaling (control signal) transmission. The radio interface protocol can be typically divided into L1 (first layer) including a PHY layer which is a physical layer, L2 (second layer) including medium access control (MAC)/radio link control (RLC)/protocol data convergence protocol (PDCP) layers, and L3 (third layer) including a radio resource control (RRC) layer, as illustrated in FIGS. 2 and 3, based on the three lower layers of an open system interconnection (OSI) reference model widely known in the field of communication systems. These layers are present in pairs in the UE and E-UTRAN, thereby performing data transmission of the Uu interface.

FIG. 3 is a view illustrating a control plane and a user plane of a radio interface protocol between a UE and an E-UTRAN based on a 3GPP radio access network specification.

Referring to FIG. 3, a physical (PHY) layer, which is the first layer, provides an information transfer service to a higher layer using a physical channel. The PHY layer is connected to a MAC layer of the higher layer through a transport channel. Data between the MAC layer and the PHY layer is transferred through the transport channel. At this time, the transport channel is broadly divided into a dedicated transport channel and a common transport channel according to whether or not the channel is shared. In addition, data between different PHY layers, i.e., between the PHY layer of a transmitter side and the PHY layer of a receiver side is transferred through the PHY channel using radio resources.

The second layer includes various layers. First, the MAC layer serves to map various logical channels to various transport channels and also to perform logical channel multiplexing of mapping several logical channels to one transport channel. The MAC layer is connected to an RLC layer of a higher layer through a logical channel. The logical channel is divided into a control channel for transmitting information on a control plane and a traffic channel for transmitting information on a user plane according to the type of information to be transmitted.

The RLC layer of the second layer segments and concatenates data received from a higher layer to appropriately adjust data size such that a lower layer may transmit data to a radio section. In addition, the RLC layer provides three operation modes such as a transparent mode (TM), an un-acknowledged mode (UM), and an acknowledged mode (AM) so as to guarantee various Quality of Service (QoS) required by each radio bearer (RB). In particular, the RLC layer in the AM performs data retransmission through an automatic repeat and request (ARQ) function to reliably transmit data.

A PDCP layer of the second layer performs a header compression function for reducing the size of an IP packet header, wherein the IP packet is relatively large in size and contains unnecessary control information, in order to efficiently transmit an IP packet such as an IPv4 or IPv6 packet in a radio section with relatively narrow bandwidth. Due to this, only essential information is transmitted in the header part of data, thereby serving to increase the transmission efficiency of the radio section. In addition, in an LTE system, the PDCP layer performs a security function, which includes ciphering to prevent un-authorized users from intercepting data and integrity protection to prevent un-authorized users from manipulating data.

An RRC layer located at the uppermost portion of the third layer is defined only in the control plane. The RRC layer serves to control logical channels, transport channels, and physical channels in relation to configuration, re-configuration, and release of RBs. Here, the RB denotes a logical path provided by the first and second layers of a radio protocol to transfer data between the UE and the UTRAN. In general, configuring the RB refers to a procedure for specifying the characteristics of a radio protocol layer and a channel required to provide a specific service and establishing detailed parameters and operation methods of the radio protocol layer and the channel. The RB is divided into a signaling RB (SRB) and a data RB (DRB). The SRB is used as a path for transmitting an RRC message in the control plane and the DRB is used as a path for transmitting user data in the user plane.

A non-access stratum (NAS) layer is defined only in the control plane of the UE and the MME. NAS control protocol is terminated in the MME on the network side and perform functions such as an evolved packet system (EPS) bearer management, authentication, EPS connection management (ECM)-idle state (ECM-IDLE) mobility handling, call origination in ECM-IDLE, and security control. To manage mobility of the UE in the NAS layer, two states are defined, i.e. an EPS mobility management (EMM)-registered state (EMM-REGISTERED) and an EMM-deregistered state (EMM-DEREGISTERED). These two states are applied to the UE and the MME. Initially, the UE is in the EMM-DEREGISTERED state. To access the network, the UE performs a process of registering with the network through an initial attach procedure. If the attach procedure is successfully performed, the UE and the MME enter the EMM-REGISTERED state.

Meanwhile, to manage a signaling connection between the UE and the EPC, an ECM-idle (ECM-IDLE) state and an ECM-connected (ECM-CONNECTED) state are defined. These two states are applied to the UE and the MME. When the UE in the ECM-IDLE state establishes an RRC connection with the E-UTRAN, the UE enters the ECM-CONNECTED state. When the MME in the ECM-IDLE state establishes an RRC connection with the E-UTRAN, the MME enters the ECM-CONNECTED state. When the UE is in the ECM-IDLE state, the E-UTRAN does not contain context information of the UE. Therefore, the UE in the ECM-IDLE state performs a UE-based mobility related procedure such as cell selection or reselection without the need of receiving a command from the network. On the other hand, when the UE is in the ECM-CONNECTED state, mobility of the UE is managed by the command of the network. If a location of the UE in the ECM-IDLE state becomes different from a location known to the network, the UE reports the location thereof to the network through a TA update procedure.

Referring back to FIG. 2, The E-UTRAN may include home eNBs (HeNBs) and may deploy an HeNB gateway (GW) for the HeNBs. The HeNBs are connected to the EPC through the HeNB GW or are directly connected to the EPC. The HeNB GW is recognized by the MME as a normal cell and is recognized by the HeNBs as the MME. Accordingly, the HeNB is connected to the HeNB GW through the S1 interface S1 and the HeNB GW is connected to the EPC through the S1 interface. In addition, even in the case that the HeNB is directly connected to the EPC, the HeNB is connected to the EPC through the interface S1.

The HeNB may be installed in an area covered by the macro eNB (overlay type) or may be installed in a shadow area that cannot be covered by the macro eNB (non-overlay type). Generally, as compared with an eNB owned by a mobile communication network operator, the HeNB has lower radio transmission output. Accordingly, a service coverage provided by the HeNB is usually smaller than a service coverage provided by the eNB. For this reason, the HeNB is referred to as a micro eNB. For example, a pico eNB, a femto eNB, a relay, etc. may be micro eNBs. The micro eNB corresponds to a small-scale version of a macro eNB. Accordingly, the micro eNB may independently operate while performing most of the functions of the macro eNB. As compared to the macro eNB, the micro eNB has a narrower coverage range and lower transmission power and may accommodate a smaller number of UEs. In the present invention, a network in which the macro eNB coexists with the micro eNB even when the same radio access technology (RAT) is used is referred to as a heterogeneous network and a network including only the macro eNB or including only the micro eNBs is referred to as a homogeneous network. For example, each of a pico eNB, a femto eNB, a HeNB, and a relay may be the micro eNB and a geographic region to which a communication service is provided by the micro eNB may be referred to as a micro cell, a pico cell, a femto cell, etc.

Meanwhile, a HeNB may be configured to provide services only to a closed subscriber group (CSG). In this case, a cell of the HeNB providing services only to the CSG is referred to as a CSG cell. Each CSG cell has its own identity, which is called a CSG identity (ID). The UE may have a list of CSGs to which the UE belongs as a member of the CSGs. The CSG list may be changed at the request of the UE or by the command of the network. Generally, one HeNB may support one CSG. The HeNB transmits a CSG ID of a CSG supported thereby through system information and permits only access thereto by the UE which is a member of the CSG. Upon detecting a CSG cell, the UE may confirm which CSG the CSG cell supports by reading the CSG ID included in the system information. The UE, which has read the CSG ID, regards the corresponding cell as an accessible cell only when the UE is a member of the CSG cell. The HeNB does not always have to permit access only to the CSG UE. According to configuration of the HeNB, access to a UE other than the CSG UE may be permitted. Determination to which UE access is allowed may be changed depending on configuration of an operation mode of the HeNB.

Figure 4:
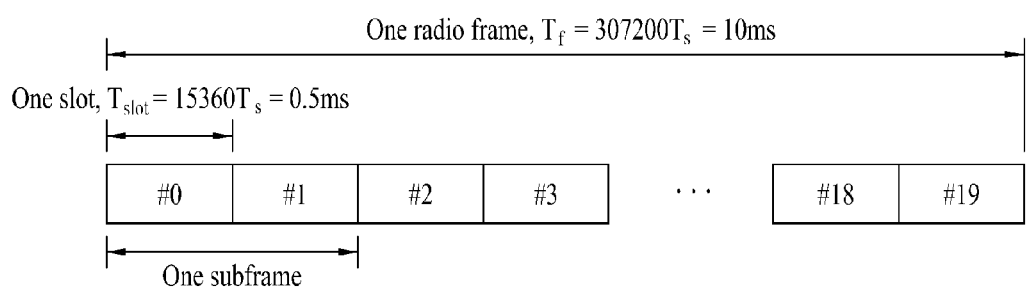
FIG. 4 is a view illustrating an exemplary structure of a radio frame used in a wireless communication system.

FIG. 4 illustrates an exemplary structure of a radio frame used in a wireless communication system. Especially FIG. 4 illustrates the structure of a radio frame used in 3GPP LTE(-A).

Referring to FIG. 4, a 3GPP LTE(-A) radio frame is 10 ms ($307200T_s$) in duration. The radio frame is divided into 10 subframes of equal size. Subframe numbers may be assigned to the 10 subframes within one radio frame, respectively. $T_s$ denotes sampling time, where $T_s=1/(2048 \times 15 \text{ kHz})$. Each subframe is 1 ms long and further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by radio frame numbers (or radio frame indexes), subframe numbers (or subframe indexes), slot numbers (or slot indexes), and the like.

The radio frame may have different configurations according to duplex mode. In FDD mode for example, since downlink transmission and uplink transmission are discriminated according to frequency, a radio frame for a specific frequency band includes either downlink subframes or uplink subframes. In TDD mode, since downlink transmission and uplink transmission are discriminated according to time, a radio frame for a specific frequency band operating in a specific carrier frequency includes both the downlink subframe(s) and the uplink subframe(s).

An eNB and a UE transmit and receive data and/or control information scheduled in a prescribed time unit, for example, in the units of subframes. The data is transmitted and received through a data region configured in an uplink/downlink subframe and the control information is transmitted and received through a control region configured in the uplink/downlink region. For this, various physical channels carrying radio signals are configured in the uplink/downlink subframe.

Hereinafter, an RRC state and RRC connection method of the UE will be described. The RRC state refers to whether or not the RRC layer of the UE is logically connected to the RRC layer of the E-UTRAN. If connected, then it is called an RRC_CONNECTED state and, otherwise, it is called an RRC_IDLE state.

Especially, when the UE is initially turned on by a user, the UE first searches for a suitable cell and then camps in the corresponding cell in an RRC_IDLE state. The E-UTRAN cannot recognize the UE in the RRC_IDLE state in a cell unit and, therefore, a core network (CN) manages the UE in a TA unit, which is a unit larger than a cell. The UE in the RRC_IDLE state may receive broadcast system information and paging information while performing discontinuous reception (DRX) configured by the NAS and may be assigned a UE-specific identity. In addition, the UE in the RRC_IDLE state may perform selection and reselection of a public land mobile network (PLMN).

To receive services such as voice or data from the cell, the UE in the RRC_IDLE state should transition to an RRC_CONNECTED state. The UE in the RRC_IDLE state establishes an RRC connection with RRC of the E-UTRAN through an RRC connection establishment process only when it is required to make an RRC connection, thereby changing the state to the RRC_CONNECTED state. There are several cases when the UE in the RRC_IDLE state is required to make an RRC connection. For example, uplink data transmission is required due to a phone call attempt by the user or transmission of a response message is required in response to a paging message received from the E-UTRAN. The E-UTRAN can recognize the presence of the UE in an RRC_CONNECTED state in a cell basis and, thus, the E-UTRAN can effectively control the UE. Accordingly, the network may transmit data to the UE in the RRC_CONNECTED state and receive data from the UE. In the RRC_CONNECTED state, the network may control mobility of the UE (handover, inter-RAT cell change, etc.) and control the UE to perform measurement for a neighboring cell.

Figure 5:
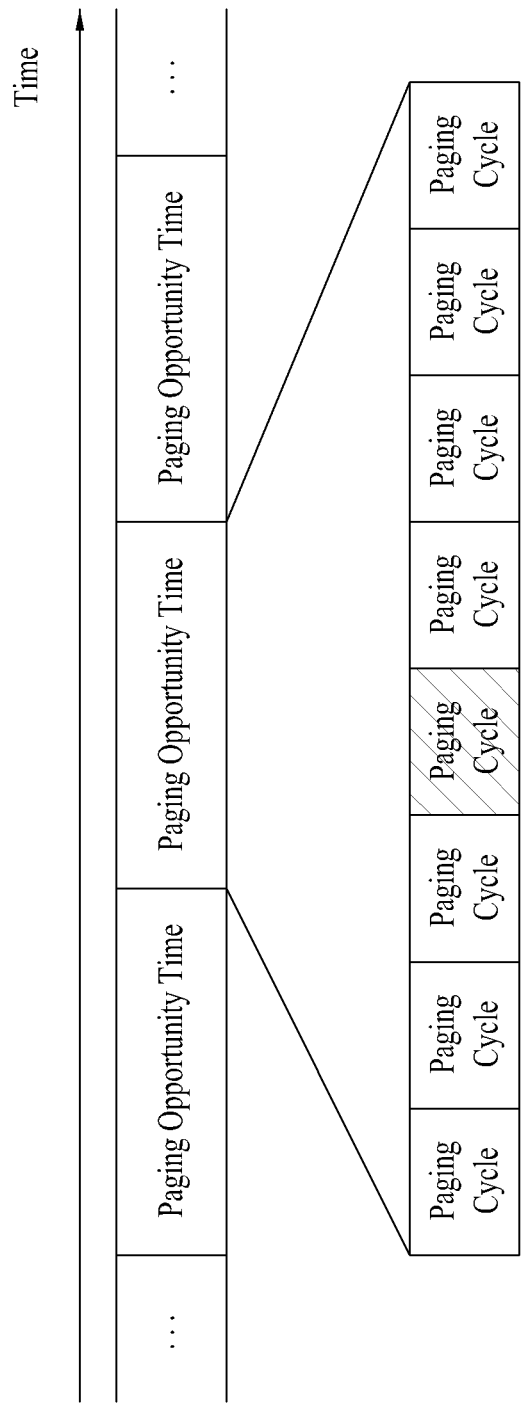
FIG. 5 is a view explaining a general transmission and reception method using a paging message.

FIG. 5 is a view explaining a general transmission and reception method using a paging message.

Referring to FIG. 5, the paging message includes a paging record comprised of a paging cause and a UE identity. Upon receiving the paging message, the UE may perform a DRX operation in order to reduce power consumption.

Specifically, a network configures a plurality of paging occasions (POs) in every time cycle called a paging DRX cycle and a specific UE receives only a specific PO to acquire the paging message. The UE may not receive a paging channel in POs other than the specific PO and may be in a sleep state in order to reduce power consumption. One PO corresponds to one TTI.

The eNB and the UE use a paging indicator (PI) as a specific value indicating transmission of the paging message. The eNB may define a specific identity (e.g. paging-radio network temporary identity (P-RNTI)) as the PI and inform the UE of paging information transmission. For example, the UE wakes up in every DRX cycle and receives one subframe to determine the presence of a paging message directed thereto. In the presence of the P-RNTI on an L1/L2 control channel (a physical downlink control channel (PDCCH)) in the received subframe, the UE is aware that a paging message exists on a PDSCH of the subframe. When the paging message includes an identity of the UE (e.g. an international mobile subscriber identity (IMSI)), the UE receives a service by responding to the eNB (e.g. establishing an RRC connection or receiving system information).

Meanwhile, system information includes essential information necessary to connect a UE to an eNB. Accordingly, the UE should receive all system information before connecting to the eNB and should always have up-to-date system information. The eNB periodically transmits the system information because all UEs located in a cell should know the system information. The system information may be divided into a master information block (MIB), a scheduling block (SB), and a system information block (SIB). The MIB enables a UE to become aware of a physical configuration of a cell (e.g. bandwidth). The SB indicates transmission information of SIBs, for example, a transmission period. The SIB is a set of associated system information. For example, a specific SIB includes only information about peripheral cells and another SIB includes only information about an uplink channel used by the UE.

The UE continues to perform measurement in order to maintain communication link quality with a cell providing services thereto, i.e. a serving cell. In addition, to support UE mobility, the UE continuously measures quality of the serving cell and neighboring cells in at least every DRX cycle. The UE may report the result of cell quality measurement to a network at a proper time and the network may provide optimal mobility to the UE through handover, etc. In the present invention, 'measurement' may refer to measuring a quality value of a communication link of a corresponding cell, performed by the UE, using reference signals (RSs) received from cells operating in an inter-frequency, an intra-frequency, and an inter-RAT according to a measurement configuration received from the network. In addition, 'quality' may indicate signal quality or cell quality deduced based on RS(s) received from a measurement target cell. The channel state/quality of a specific cell may refer to the state/quality of a channel or a radio link formed between an eNB or an antenna group providing a communication service to the specific cell and the UE.

To maintain communication link quality with a serving cell, the UE determines whether or not communication link quality with a current serving cell is corresponding to a situation capable of performing communication. If the quality of the current cell is determined to be a poor state incapable of performing communication, the UE declares a radio link failure (RLF). Upon declaring the RLF, the UE gives up maintaining communication with the corresponding cell and attempts to perform RRC connection reestablishment after selecting a cell through a cell selection procedure.

Figure 6:
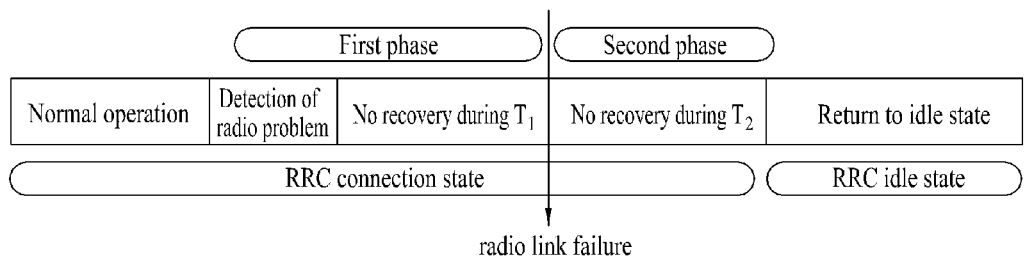
FIG. 6 is a view explaining the operation of a UE related to a radio link failure (RLF).

FIG. 6 is a view explaining the operation of a UE related to an RLF. Referring to FIG. 6, the operation of the UE related to the RLF may be explained as two phases.

In the first phase, the UE checks whether there is a problem in a current communication link. If there is a problem in a radio link, the UE declares an RLF and waits for recovery of the communication link for a prescribed time T1. If the link is recovered for this time, the UE continues to perform a normal operation. If the radio link problem detected in the first phase is not recovered for the time T1, the UE declares an RLF and enters the second phase. In the second phase, the UE performs an RRC connection reestablishment process for recovery from the RLF. The RRC connection reestablishment process is a process of reestablishing an RRC connection again in an RRC connected state (RRC_CONNECTED). Since the UE remains in the RRC_CONNECTED state, i.e. since the UE does not enter an RRC idle state (RRC_IDLE), the UE does not initialize all radio configurations thereof (e.g. RB configurations). Instead, the UE temporarily suspends use of all RBs except for SRB0 upon starting the RRC connection reestablishment process. If the RRC connection reestablishment process is successful, the UE resumes use of the RBs, use of which has been temporality suspended. However, if the UE does not complete RRC connection re-establishment within a prescribed time T2, the UE enters the RRC_IDLE state.

If the UE in the RRC_CONNECTED state with an eNB of a serving cell detects an RLF or handover failure, the UE stores information about occurrence of a radio link obstacle, i.e. RLF information. Upon storing the RLF information, the UE reports availability of the RLF information to an eNB of a cell to which a connection is established through an RRC connection reestablishment request message or an RRC connection reconfiguration message. Meanwhile, if the UE enters the RRC_IDLE state due to an RRC connection reestablishment failure, an RRC layer of the UE may perform an RRC connection configuration process according to instruction of a NAS layer to transition to the RRC_CONNECTED state again. In this case, the UE, which has entered the RRC_IDLE state, may report availability of the RLF information to a cell in which a current RRC connection is configured, through an RRC connection configuration complete message.

Thus, if the UE reports availability of the RLF information, the eNB, which has received an indication of availability of the RLF information, transmits a UE information request message to the UE to request that the UE transmit the RLF information. Upon receiving the UE information request message, the UE reports the RLF information stored therein to the eNB through a UE information response message. The RLF information includes a measurement result in the serving cell, available location information on where the RLF has occurred, and a cell ID of a successfully connected last cell prior to the RLF.

Meanwhile, in a 3GPP LTE-A system, study into enhanced intercell interference coordination (eICIC) for reducing interference between a first eNB (eNB 1) and a second eNB (eNB 2) in a heterogeneous network (HetNet) is underway. To this end, an almost blank subframe (ABS) is typically considered. In a subframe designated as the ABS, only a specific downlink signal, for example, a cell-specific reference signal (CRS), is transmitted or a downlink signal is transmitted at very weak transmit power. Accordingly, a subframe(s) configured as the ABS and another subframe(s) not configured as the ABS, among subframes in a radio frame, have different interference levels. In the following description, a cell which creates interference with respect to a specific cell is referred to as an interfering cell or an aggressor cell and a cell subject to interference from a specific cell is referred to as an interfered cell or a victim cell. If a signal of a neighboring cell creates interference with respect to a signal of a specific cell, the neighboring cell becomes the interfering cell with respect to the specific cell and the specific cell becomes the interfered cell or victim cell with respect to the neighboring cell. Thus, if neighboring cells interfere with each other or generate interference with respect to other cells, such interference is referred to as inter-cell interference (IQ). An eNB of an interfering cell is referred to as an interfering eNB and an eNB of an interfered cell is referred to as an interfered eNB.

Figure 7:
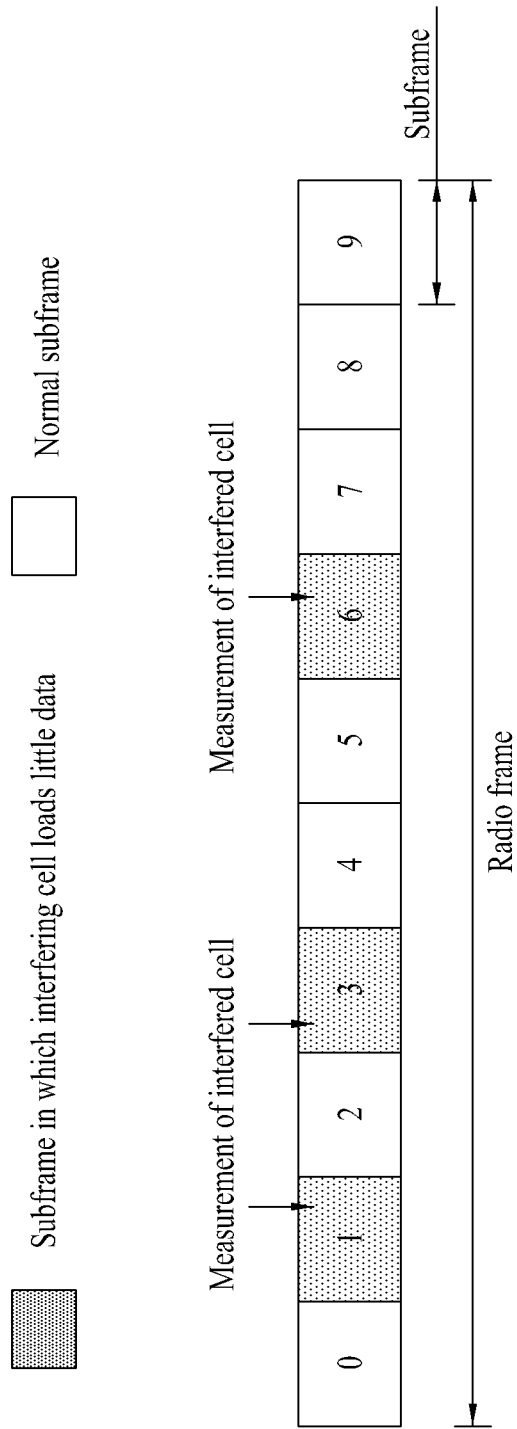
FIG. 7 is a view illustrating an example of applying an enhanced intercell interference coordination (eICIC) scheme in the time domain.

FIG. 7 is a view illustrating an example of applying an eICIC scheme in the time domain.

Referring to FIG. 7, if an interfering eNB configures subframes 1, 3, and 6 as ABSs, an interfered eNB may perform downlink transmission in subframes 1, 3, and 6. In this case, since effective downlink for the interfered cell is formed in subframes 1, 3, and 6, a UE of the interfered cell may perform measurement in subframes 1, 3, and 6 to maintain communication link quality with the interfered cell. The interfered eNB may transmit information indicating a subframe(s) configured as the ABS or information indicating a subframe(s) upon which measurement should be performed by the UE, among a prescribed number of subframes, to a UE positioned in the interfered cell.

Figure 8:
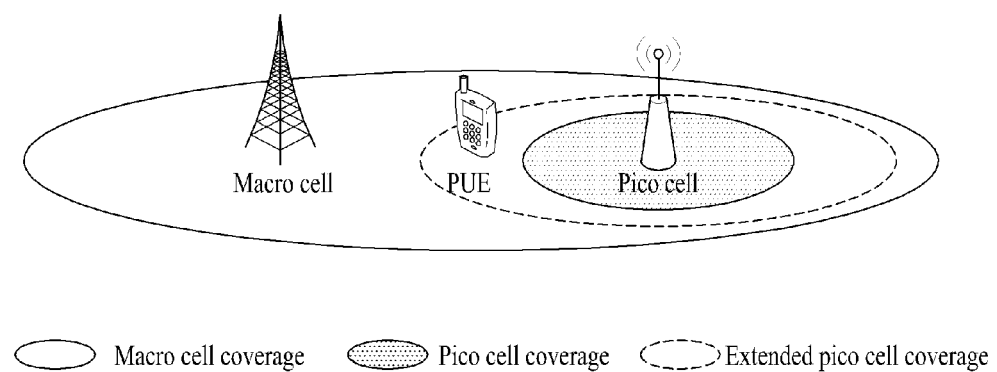
FIGS. 8 and 9 are views illustrating the case of a macro cell versus a pico cell and the case of a macro cell versus a femto cell, respectively, to which an eICIC scheme is applied.
Figure 9:
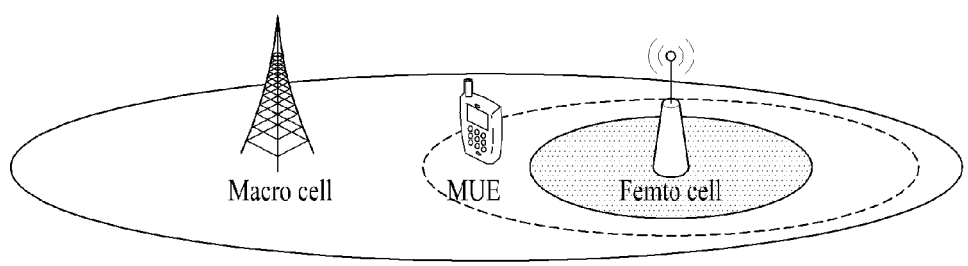

FIGS. 8 and 9 are views illustrating the case of a macro cell versus a pico cell and the case of a macro cell versus a femto cell, respectively, to which an eICIC scheme is applied.

The eICIC scheme in the time domain may be applied between a macro cell and a micro cell. In a 3GPP LTE-A system, a cell configuration caused by a macro cell and a femto cell and a cell configuration caused by the macro cell and a pico cell may be considered. It is assumed that an eNB of the macro cell and an eNB of the femto cell do not perform information exchange through an X2 interface, which is an intercell interface, and the eNB of the macro cell and an eNB of the pico cell perform information exchange through the X2 interface. That is, it is assumed that the femto cell corresponds to a CSG cell.

Referring to FIG. 8, if a UE serviced by an eNB of a pico cell (hereinafter, a PUE) uses an ABS of a macro cell in order to measure the pico cell, the PUE may experience an RLF. This is because the case in which the PUB receives a stronger signal from the macro cell occurs even if the PUE is positioned in a coverage range of the pico cell. If a radio link with the pico cell fails, the PUE may transition to an RRC_IDLE state and then to an RRC_CONNECTED state and report RLF information including the measurement result of the last serving cell, i.e. the pico cell, to the network.

Referring to FIG. 9, in a situation in which a UE serviced by an eNB of a macro cell (hereinafter, an MUE) is subjected to strong interference from a femto cell, the MUE may measure the macro cell using an ABS of the femto cell in order to maintain a service received from the macro cell. In this case, the MUE may experience an RLF due to strong interference from the femto cell. If a radio link with the macro cell fails, the MUE may transition to an RRC_IDLE state and then to an RRC_CONNECTED state and report RLF information including the measurement result of the last serving cell, i.e. the macro cell to the network.

Upon detecting an RLF or handover failure and reporting RLF information to the network, the UE reports RLF information including a channel measurement value etc. of the last serving cell (the pico cell of FIG. 8 or the macro cell of FIG. 9) to the eNB, irrespective of whether the UE performs communication in an ABS with an eNB to which a current RRC connection is established. In this case, the network, which has received the RLF information, may incorrectly interpret the RLF information. If the UE measuring the serving cell in an ABS(s) for eICIC detects an RLF and fails to perform RRC connection reestablishment, the UE transitions to an RRC_IDLE state and releases an RRC connection with the network. If RRC connection establishment is released, the network deletes context for the UE. Accordingly, the network receiving the RLF information from the UE which has transitioned to the RRC_IDLE state and then to the RRC_CONNECTED state again cannot identify in which subframe, in which cell, in which carrier frequency, or in which PLMN the RLF information has been measured. For example, in the cases of FIGS. 8 and 9, if it is determined that the network has not been used to measure the serving cell, since the network will determine that the serving cell does not use the ABS, the coverage of the serving cell will be assumed to be wider than actual coverage. That is, according to a conventional RLF reporting method, since use/non-use of the ABS is not indicated in an RLF report transmitted by the UE to the network, available position information in the RLF report may provide incorrect information regarding coverage of the serving cell to the network.

Meanwhile, current 3GPP LTE(-A) specifies that the RLF report be provided to the network irrespective of whether a cell in which an RLF is detected is a CSG cell or not. However, a CSG cell permitting access by only UEs belonging to a CSG is not controlled by an operator unlike a macro cell which is deployed by the operator and permits access by all UEs. Accordingly, the operator does not need the RLF report for the CSG cell(s).

Meanwhile, a PLMN refers to a network established and operated by a specific operator in order to provide a communication service to a UE(s). Each PLMN includes an MME and an S-GW. A prescribed geographic area, i.e. a cell, may be shared by a plurality of PLMNs. An eNB of the cell shared by the plural PLMNs broadcast PLMN IDs of the plural PLMNs to the cell. The UE is serviced by one PLMN among the plural PLMNs. Since different PLMNs have different operators, even if the UE experiences an RLF in a specific PLMN, operators of PLMNs other than the specific PLMN does not need the RLF report.

Accordingly, the present invention proposes not to store RLF information, or not to report the RLF information even though the RLF information is stored, when a cell for which a UE detects an RLF in a (sub)frame is a specific type of cell (e.g. a CSG cell). In addition, the present invention proposes not to store RLF information, or not to report the RLF information even though the RLF information is stored, when a (sub)frame in which an RLF is detected is a specific type of subframe (e.g. an ABS). The present invention also proposes for a UE not to report the RLF information when a PLMN ID of a cell in which an RLF is detected is different from a PLMN ID of a cell receiving an RLF report.

Figure 10:
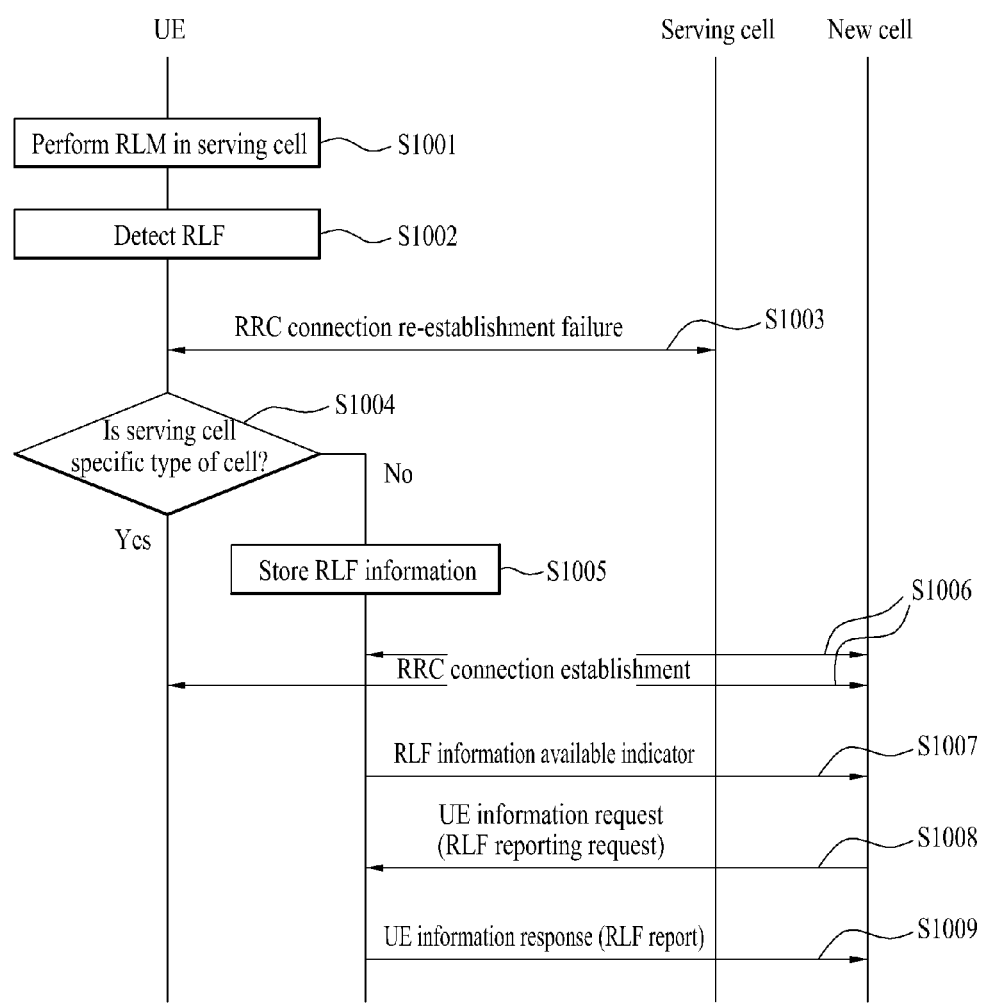
FIG. 10 is a view illustrating an exemplary RLF reporting flow according to an embodiment of the present invention.

FIG. 10 is a view illustrating an exemplary RLF reporting flow according to an embodiment of the present invention.

A UE performs radio link monitoring (RLM) to measure a radio channel (or radio signal) of a cell receiving a communication service (hereinafter, a serving cell), in one or more (sub)frames (S1001). An eNB of the serving cell (hereinafter, a serving cell) may inform the UE of the (sub)frame(s) in which a radio link is to be measured (not shown). For example, the serving cell may transmit ABS pattern information to the UE to inform the UE of the subframe(s) in which the UE is to perform measurement.

If an obstacle occurs in the radio link of the serving cell due to an RLF or handover failure, the UE detects the RLF (S1002). For example, upon detecting out-of-synchronization in successive (sub)frames, the UE may declare the RLF. In this case, the UE declares the RLF for the (sub)frames of the serving cell and then attempts to recover the radio link. That is, the UE may perform an RRC connection reestablishment process. However, if the UE fails to recover the radio link in the serving cell, in other words, if the UE fails to perform the RRC connection reestablishment process (S1003), the HE transitions to an RRC_IDLE state.

While transitioning to the RRC_IDLE state, if the serving cell is not a specific type of cell (e.g. a CSG cell) (S1004), the UE configures and stores RLF information (S1005). If the serving cell is a specific type of cell (e.g. a CSG cell) (S1004), the UE may not store the RLF information.

In the RRC_IDLE state, an RRC layer of the UE may select a new cell and initiate an RRC connection process with an eNB of the new cell (hereinafter, a new cell) (S1006). In this case, if the serving cell in which the RLF is detected, i.e. if a last serving cell is not a specific type of cell, the UE may transmit an indicator indicating that the RLF information is available to the new cell (S1007). The indicator indicating that the RLF information is available may be included in an RRC connection establishment complete message of the RRC connection process prior to transmission to the new cell from the UE. The new cell may transmit a UE information request message requesting an RLF report to the UE (S1008). Upon receiving the UE information request message, the UE may transmit a UE information response message including the RLF information to the new cell (S1009). However, if the last serving cell in which the RLF is detected is a specific type of cell, the UE does not perform steps S1007 to S1009.

Meanwhile, even if the UE has configured and stored the RLF information because the last serving cell is not a specific type of cell, the UE may not report the RLF information to the new cell. For example, if a PLMN ID of the last serving cell is different from a PLMN ID of the new cell, the UE may not transmit the indicator indicating that the RLF information is available to the new cell. That is, the UE may perform steps S1007 to S1009 when the PLMN ID of the last serving cell is equal to the PLMN ID of the new cell and may not perform steps S1007 to S1009 when the PLMN ID of the last serving cell is different from the PLMN ID of the new cell.

In the embodiment of FIG. 10, the RLF information stored in the UE (hereinafter, stored RLF information) and RLF information reported to the new cell (hereinafter, RLF reporting information) include a measurement result of the last serving cell which has been successfully connected before the RLF, a cell ID of the serving cell, and information about a position at which RLF has occurred. The measurement result may include at least one of reference signal received power (RSRP), reference signal received quality (RSRP), a received signal strength indicator (RSSI), and an interference level, in the last serving cell. In addition, the stored RLF information and/or the RLF reporting information may include information indicating whether the radio link obstacle is caused by the RLF or handover failure.

The present invention proposes to further include information about a cell type of the last serving cell, information about a carrier frequency in which the RLF is detected, information about a PLMN ID of the last serving cell, and/or information about a (sub)frame in which the RLF is detected, in the stored RLF information and/or the RLF reporting information. The information about the cell type may be information indicating whether the last serving cell is a CSG cell. In relation to the PLMN ID of the last serving cell, if the last serving cell is shared by a plurality of PLMNs, the RLF reporting information may be generated to include a plurality of PLMN IDs. One of the plural PLMNs is a PLMN to which the UE has connected/attached in the last serving cell, i.e. R-PLMN. The RLF reporting information may be generated to include not all PLMN IDs of the last serving cell but an R-PLMN ID in the last serving cell. The information about the (sub)frame in which the RLF is detected includes information indicating whether the RLF has occurred in a subframe(s) configured as an ABS or in a normal subframe(s).

If the RLF reporting information includes the information about the carrier frequency in which the RLF has occurred, a network may know, in some cases, in which situation the RLF is generated. For example, in in-device coexistence (IDC) communication, a predetermined carrier frequency is used and, if a carrier frequency included in the RLF reporting information is the predetermined carrier frequency for IDC, the network may figure out that the RLF has occurred due to IDC. IDC refers to coexistence of various wireless communication systems, such as LTE, WiFi, Bluetooth (BT), and a global navigation satellite system (GNSS), in one UE.

The present invention may be applied even to an RLF detected in a specific type of (sub)frame. For example, instead of a condition "Is serving cell specific type of cell?" in step S1004 of FIG. 10, a condition "Is subframe in which RLF is detected is specific type of subframe?" may be determined. Alternatively, the condition "Is serving cell specific type of cell?" may be determined in step S1004 of FIG. 10 together with the condition "Is subframe in which RLF is detected specific type of subframe?".

Figure 11:
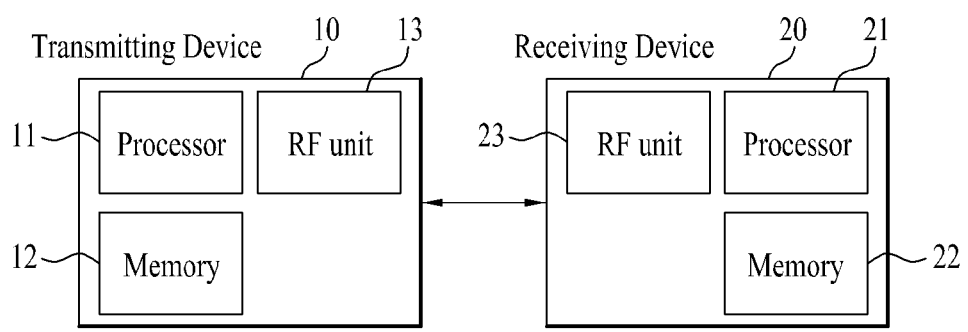
FIG. 11 is a block diagram illustrating elements of a transmitter 10 and a receiver 20 implementing the present invention.

FIG. 11 is a block diagram illustrating elements of a transmitter 10 and a receiver 20 implementing the present invention.

The transmitter 10 and the receiver 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so as to perform at least one of the above-described embodiments of the present invention.

The memories 12 and 22 may store programs for processing and controlling the processors 11 and 21 and may temporarily store input/output information. The memories 12 and 22 may serve as buffers.

The processors 11 and 21 typically control the overall operation of various modules in the transmitter or the receiver. The processors 11 and 21 may perform various control functions to perform the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitter 10 is scheduled by the processor 11 or a scheduler connected to the processor 11 and codes and modulates signals and/or data to be transmitted to the exterior. The coded and modulated signals and/or data are transmitted to the RF unit 13. For example, the processor 11 converts a data stream to be transmitted into K layers through demultiplexing, channel coding, scrambling, and modulation processes. The coded data stream is also referred to as a codeword and is equivalent to a transport block which is a data block provided by a MAC layer. One Transport Block (TB) is coded into one codeword and each codeword is transmitted to the receiver in the form of one or more layers. For frequency up-conversion, the RF unit 13 may include an oscillator. The RF unit 13 may include $N_t$ (where $N_t$ is a positive integer) transmit antennas.

A signal processing process of the receiver 20 is the reverse of the signal processing process of the transmitter 10. Under control of the processor 21, the RF unit 23 of the receiver 10 receives radio signals transmitted by the transmitter 10. The RF unit 23 may include Nr receive antennas and frequency down-converts each signal received through receive antennas into a baseband signal. For frequency down-conversion, the RF unit 13 may include an oscillator. The processor 21 decodes and demodulates the radio signals received through the receive antennas and restores data that the transmitter 10 originally desired to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiver 20. An RS transmitted through a corresponding antenna defines an antenna viewed in terms of the receiver 20 and enables the receiver 20 to perform channel estimation for the antenna, irrespective of whether a channel is a single radio channel transmitted from one physical channel or a composite channel transmitted from a plurality of physical antennas including the antenna. That is, an antenna is defined such that a channel for transmitting a symbol on the antenna can be derived from the channel through which another symbol on the same antenna is transmitted. An RF unit supporting a Multiple Input Multiple Output (MIMO) function of transmitting and receiving data using a plurality of antennas may be connected to two or more antennas.

In the embodiments of the present invention, the UE operates as the transmitter 10 in uplink and as the receiver 20 in downlink. In the embodiments of the present invention, the eNB operate as the receiver 20 in uplink and operate as the transmitter 10 in downlink.

A processor of a UE (hereinafter, a UE processor) performs an RLM for measuring a radio link of a serving cell in one or more (sub)frames. A processor in an eNB of a serving cell (hereinafter, a serving cell processor) may configure a (sub)frame(s) in which the radio link is to be measured at the UE and control an RF unit of the serving cell (hereinafter, a serving cell RF unit) to transmit information indicating the configured (sub)frame(s) to the UE. Upon detecting an RLF, the UE processor declares the RLF for the serving cell and attempts to recover the radio link. The UE processor may attempt to recover the radio link by performing an RRC connection reestablishment process to the serving cell. The UE processor may control an RF unit of the UE (hereinafter, a UE RF unit) to transmit an RRC connection reestablishment request message in the RRC connection reestablishment process, control the UE RF unit to receive an RRC connection reestablishment message from the serving cell, and control the UE RF unit to transmit an RRC connection reestablishment complete message to the serving cell. However, if the RRC connection reestablishment process fails, the UE processor transitions to an RRC_IDLE state. If the serving cell is not a specific type of cell (e.g. a CSG cell) and/or a (sub)frame in which the RLF is detected is not a specific type of subframe, the UE processor stores RLF information in a memory of the UE (hereinafter, a UE memory) while transitioning to the RRC_IDLE state. Notably, if the serving cell is a specific type of cell (e.g. a CSG cell) and/or if a (sub)frame in which the RLF is detected is a specific type of subframe, the UE may not store the RLF information in the UE memory.

In the RRC_IDLE state, the UE processor may select a new cell and control the UE RF unit to initiate an RRC connection process with an eNB of the new cell (hereinafter, a new cell). In this case, if the serving cell in which the RLF is detected, i.e. the last serving cell, is not a specific type of cell and/or if a (sub)frame in which the RLF is detected is not a specific type of subframe, the UE processor may control the UE RF unit to transmit an indicator indicating that the RLF information is available to the new cell. The UE processor may make an RRC connection establishment complete message of the RRC connection process include the indicator indicating that the RLF information is available and control the UE RF unit to transmit the RRC connection establishment complete message to the new cell. A processor of the new cell (hereinafter, a new cell processor) may configures a UE information request message for requesting an RLF report and control an RF unit of the new cell (hereinafter, a new cell RF unit) to transmit the UE information request message to the UE. If the UE RF unit receives the UE information request message, the UE processor may configure a UE information response message including the RLF information and control the UE RF unit to transmit the UE information response message to the new cell. However, if the last serving cell in which the RLF is detected is a specific type of cell and/or a (sub)frame in which the RLF is detected is a specific type of subframe, the UE processor may control the UE RF unit not to transmit the indicator indicating that the RLF information is available to the new cell. Accordingly, the UE processor may control the UE RF unit not to receive the UE information request message from the new cell and control the UE RF unit not to transmit the UE information response message. If the last serving cell in which the RLF is detected is a specific type of cell and/or a (sub)frame in which the RLF is detected is a specific type of subframe, since the RF unit of the new cell does not receive the indicator indicating that the RLF information is available, the new cell processor does not perform any procedure for receiving the RLF information.

Even if the UE processor has stored the RLF information in the UE memory because the last serving cell is not a specific type of cell (and/or because a (sub)frame in which the RLF is detected is not a specific type of subframe), the UE may not report the RLF information to the new cell. For example, if a PLMN ID of the last serving cell is different from a PLMN ID of the new cell, the UE processor may control the UE RF unit not to transmit the indicator indicating that the RLF information is available to the new cell. Even in this case, since the new cell RF unit does not receive the indicator indicating that the RLF information is available, the new cell processor does not perform any procedure for receiving the RLF information.

The UE processor may generate RLF information, stored in the UE memory and/or reported to the new cell, to include a measurement result of the last serving cell which has been successfully connected before the RLF, a cell ID of the serving cell, and information about a position in which the RLF has occurred. The UE processor may also generate RLF information, stored in the UE memory and/or reported to the new cell, to (further) include information indicating whether a radio link obstacle is caused by the RLF or handover failure, information about a cell type of the last serving cell, information about a carrier frequency in which the RLF is detected, information about a PLMN ID of the last serving cell, and/or information about a (sub)frame in which the RLF is detected.

According to the present invention, the UE can be prevented from reporting unnecessary information to a network. In addition, according to the present invention, the risk of incorrectly interpreting RLF information by the network can be reduced and, therefore, operation efficiency of the network by an operator can be increased.

The detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to an eNB, a UE, or other equipment in a wireless communication system.

The invention claimed is:

1. A method for determining, by a user equipment, whether to transmit signals in a radio communication system, the method comprising:
    detecting a radio link failure for a first cell in at least one frame;
    determining whether to store a report on the radio link failure according to a type of the first cell, wherein the report on the radio link failure is not stored when the type of the first cell corresponds to a closed subscriber group (CSG) cell; and
    establishing a radio resource control (RRC) connection to a second cell,
    wherein the establishing comprises determining whether to transmit the stored report to the second cell when the stored report exists, and
    wherein the stored report is determined not to be transmitted to the second cell when a public land mobile network identifier (PLMN ID) of the first cell is not the same as a PLMN ID of the second cell.

2. The method according to claim 1, wherein the report on the radio link failure is stored if the type of the first cell does not correspond to the CSG cell.

3. The method according to claim 1, wherein the report on the radio link failure is not stored if a type of the at least one frame corresponds to an almost blank subframe (ABS).

4. The method according to claim 1, wherein the report on the radio link failure includes at least one of information about the type of the first cell and information about a type of the at least one frame.

5. The method according to claim 2, further comprising:
    receiving a radio link failure reporting request message from the network and transmitting the stored report on the radio link failure to the network through the second cell.

* * * * *